US009481555B2

(12) United States Patent
Rosenberg et al.

(10) Patent No.: US 9,481,555 B2
(45) Date of Patent: Nov. 1, 2016

(54) INDUSTRIAL TRUCK HAVING AN OVERHEAD GUARD

(71) Applicant: Jungheinrich Aktiengesellschaft, Hamburg (DE)

(72) Inventors: Tilman Rosenberg, Hamburg (DE); Jan Herschel, Bad Oldesole (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 14/774,422

(22) PCT Filed: Mar. 3, 2014

(86) PCT No.: PCT/EP2014/054057
§ 371 (c)(1),
(2) Date: Sep. 10, 2015

(87) PCT Pub. No.: WO2014/139817
PCT Pub. Date: Sep. 18, 2014

(65) Prior Publication Data
US 2016/0023871 A1 Jan. 28, 2016

(30) Foreign Application Priority Data
Mar. 14, 2013 (DE) ........................ 10 2013 004 347

(51) Int. Cl.
*B60J 7/00* (2006.01)
*B66F 9/075* (2006.01)

(52) U.S. Cl.
CPC ................................ *B66F 9/07545* (2013.01)

(58) Field of Classification Search
CPC ............ Y02T 10/7005; Y02T 10/705; Y02T 10/7072; Y02T 90/14; B66F 9/07572; C08L 2666/02; E06B 3/24; E06B 3/64; E06B 3/6604; B60J 10/70
USPC ................ 296/190.08, 190.03, 146.15, 201; 187/222, 227; 280/756
See application file for complete search history.

(56) References Cited

U.S. PATENT DOCUMENTS 2,997,333 A * 8/1961 Kauffman .............. B62D 33/06 180/89.12
3,336,074 A * 8/1967 Barnes ................ B66F 9/07545 280/756
3,443,833 A * 5/1969 Bucher ................ B60R 21/131 296/102
3,823,616 A * 7/1974 Houseman ................ B66F 9/20 180/65.1
3,841,698 A * 10/1974 Stammen ............ B66F 9/07545 280/755
4,675,933 A * 6/1987 Martin, Jr. ............ B60S 1/3404 15/250.23
4,688,846 A * 8/1987 Martin, Jr. .......... B66F 9/07545 296/102
4,702,516 A * 10/1987 Martin, Jr. ......... B62D 33/0617 29/416

(Continued)

FOREIGN PATENT DOCUMENTS

DE 2 219 972 A1 11/1973
DE 3618278 A1 12/1987

(Continued)

*Primary Examiner* — Kiran B Patel
(74) *Attorney, Agent, or Firm* — Young Basile Hanlon & MacFarlane, P.C.

(57) ABSTRACT

An industrial truck has a canopy with two columns arranged laterally on the vehicle, which support a crown equipped with one or more belts. The one or more belts are connected with an assembly plate having an opening for a glass roof, which is glued in a circumferential profile frame. The profile frame is thereby connected with at least one belt and/or support profiles extending between the belts.

12 Claims, 2 Drawing Sheets

(56) References Cited

U.S. PATENT DOCUMENTS

| | | | | |
|---|---|---|---|---|
| 4,775,570 | A | 10/1988 | Ohlenforst et al. | |
| 5,501,297 | A * | 3/1996 | Josephs | F16P 1/02 187/222 |
| 5,711,095 | A * | 1/1998 | Oda | E02F 3/325 180/327 |
| 5,806,257 | A * | 9/1998 | Cornils | B60J 10/70 296/146.15 |
| 6,149,228 | A * | 11/2000 | O'Neill | B62D 33/0621 296/190.01 |
| 6,202,394 | B1 * | 3/2001 | Russ | A01D 34/001 180/84 |
| 6,279,988 | B1 * | 8/2001 | Muraro | B60J 5/0487 160/199 |
| 6,322,133 | B1 * | 11/2001 | Yantek | B60R 21/11 280/256 |
| 7,246,846 | B2 * | 7/2007 | Shioji | E02F 9/163 180/89.12 |
| 7,467,820 | B2 | 12/2008 | Götz | |
| 7,849,951 | B2 * | 12/2010 | Borchers | B60K 1/04 180/305 |
| 8,079,636 | B2 * | 12/2011 | Namura | B62D 33/0617 296/190.08 |
| 8,262,149 | B1 * | 9/2012 | Russ | B60H 1/00407 296/102 |
| 9,242,681 | B2 * | 1/2016 | Obe | B60H 1/00378 |
| 2006/0220419 | A1 * | 10/2006 | Miura | B66F 9/07545 296/190.03 |
| 2006/0248839 | A1 * | 11/2006 | Gotz | B66F 9/07545 52/633 |
| 2008/0001435 | A1 * | 1/2008 | Kraimer | B66F 9/07545 296/190.03 |
| 2009/0242311 | A1 * | 10/2009 | Fujita | B62D 33/0617 180/291 |
| 2010/0072801 | A1 * | 3/2010 | Adelsperger | B60N 2/14 297/344.21 |
| 2011/0314871 | A1 * | 12/2011 | Olivier | C03B 23/0252 65/104 |
| 2016/0023544 | A1 * | 1/2016 | Donabedian | B60R 13/0212 296/193.12 |

FOREIGN PATENT DOCUMENTS

| | | | |
|---|---|---|---|
| DE | 102 08 889 | A1 | 9/2003 |
| DE | 10 2005 015 978 | A1 | 10/2006 |
| DE | 10 2005 049 006 | A1 | 4/2007 |
| DE | 10 2009 019 162 | A1 | 11/2010 |
| DE | 10 2011 101 919 | A1 | 10/2012 |
| FR | 2 922 876 | A1 | 5/2009 |
| GB | 2 431 191 | A | 4/2007 |
| WO | 2006/118925 | A2 | 11/2006 |
| WO | 2007/092773 | A2 | 8/2007 |

* cited by examiner

INDUSTRIAL TRUCK HAVING AN OVERHEAD GUARD

FIELD OF THE DISCLOSURE

The present invention relates to an industrial truck having an overhead guard, in particular a reach truck.

BACKGROUND

An overhead guard for an industrial truck, which consists of two assemblies, each of which have two support struts, is known from DE 10 2005 015 978. The overhead guard thus has a total of four support struts arranged on the corners of the canopy.

A counterbalanced forklift truck with a closed driver's cab, which is equipped with transparent window areas, is known from DE 102 08 889 A1. Furthermore, it is known to provide a glazed overhead guard and to clean it with a roof wiper.

It is known to form an overhead guard for reach trucks with a crown supported by two columns. In particular, since reach trucks are used at great heights, the overhead guard must be transparent so that the driver has a good view of the load. For this, horizontal struts within the crown, which partially allows a view of the extended lift mast, are provided. The horizontal struts protect the driver from falling goods. When used with liquids or in moist environments, it is also known to provide on the horizontal struts a grill for small falling parts or a transparent pane of glass for dripping liquids. But the protective function of the overhead guard is thereby ensured by the horizontal struts and their arrangement within the crown.

SUMMARY

An object of the invention is to provide an overhead guard that offers the best possible view of the lift frame without thereby foregoing the required protection for the driver.

The industrial truck according to an embodiment of the invention is equipped with an overhead guard that has two columns arranged laterally on the vehicle. The columns support a crown equipped with one or more belts. The belts of the crown are connected with an assembly plate, in which an opening for an (e.g., glass) roof is provided. The glass roof is elastically connected with a circumferential profile frame, in particular glued in it. The glass roof is fastened on the crown via the profile frame. The profile frame is thereby connected with at least one belt and/or at least one support profile extending between the belts. The crown of an overhead guard designed according to the description herein fulfills the legal requirements with respect to the stability and power of resistance with respect to falling objects. The stability is achieved in particular through the pane of glass arranged on the circumferential profile frame wherein, in order to increase stability, the profile frame is fastened either directly on the belts or on support profiles. As a rule, the profile frame is connected with a belt on one or two sides and with support profiles on the remaining sides. For vehicles with lower rated capacity, the profile frame can be connected with one or more belts even without additional support profiles.

A pair of support profiles, which extend in the vehicle's longitudinal direction between the belts, is provided in a preferred design of the industrial truck. Such an extension in the longitudinal direction means that the support profile forms an acute angle with the vehicle's longitudinal direction. Such support profiles can be arranged in a very stable manner between a belt pointing towards the front side and a belt pointing towards the back side, and thus offer good support for the profile frame in the crown.

In a preferred further development, at least one cross profile is arranged between the support profiles extending in the longitudinal direction. The cross profile is connected with the support profiles extending in the longitudinal direction and forms a further support for the profile frame of the glass roof.

In an expedient embodiment, additional support profiles are elastically connected, preferably glued, to the glass roof. The further support profiles are not required for safety-technical reasons, but rather give a user of the industrial truck a sufficient feeling of security, especially if the user previously worked under an overhead guard with horizontal struts.

In a further preferred embodiment, the crown has a front belt and a rear belt, which are connected with the assembly plate and on their ends respectively with one of the columns. The surface surrounded by the belts is mainly square and has rounded corners, wherein the columns rest on the lateral edges of the rectangle. The front belt thus extends on both side edges of the crown and forms the front edge, while the rear belt forms the rear edge and also part of the two side edges lying behind the columns.

In a particularly preferred embodiment, the assembly plate, which is arranged within the circumferential belts, is equipped with openings for the installation of additional devices at and/or on the overhead guard. The provided openings make it possible to install additional devices later on or to install the required additional devices on the vehicle depending on customer-specific equipping of the industrial truck.

In a preferred embodiment, the glass roof is designed like a trapezoid. In order to have a good view of the lift frame through the overhead guard, the wide side of the trapezoid is arranged forward towards the lift frame, while the narrower side of the trapezoid is arranged towards the back away from the lift frame.

The roof is preferably made of a safety glass, wherein laminated safety glass is expediently used. In a laminated safety glass, for example, two safety glass panes are interconnected via a film lying in between.

The profile frame, in which the glass pane is installed, preferably has an L-shaped profile in cross-section, wherein the glass roof is glued in the profile. A circumferential gluing and simultaneously a sealing of the glass edges thereby takes place. This is important in particular in the case of laminated safety glass in order to prevent moisture from getting into the glass pane.

In a preferred further development, the profile frame in the profile section arranged below the glass pane has at least one recess, through which a cutting wire can be guided through a gap between the glass pane and the profile side. With the help of the recess, it is possible to pass the cutting wire through the circumferential gap between the glass pane and the profile frame. The cutting wire lying below the glass pane is then bent by 90° towards the glass pane and the gluing between the profile frame and the glass pane is thus cut open along the profile frame. This allows a simple and easy replacement of the glass pane.

In a preferred embodiment, the support profiles and the belt(s) have a rectangular cross-section, which preferably linearly has a considerably larger width than depth. The belts are mainly installed in the crown in a vertically standing manner.

BRIEF DESCRIPTION OF THE DRAWINGS

A preferred embodiment of the overhead guard is explained in greater detail below with respect to the figures in which.

DETAILED DESCRIPTION

Figure 1:
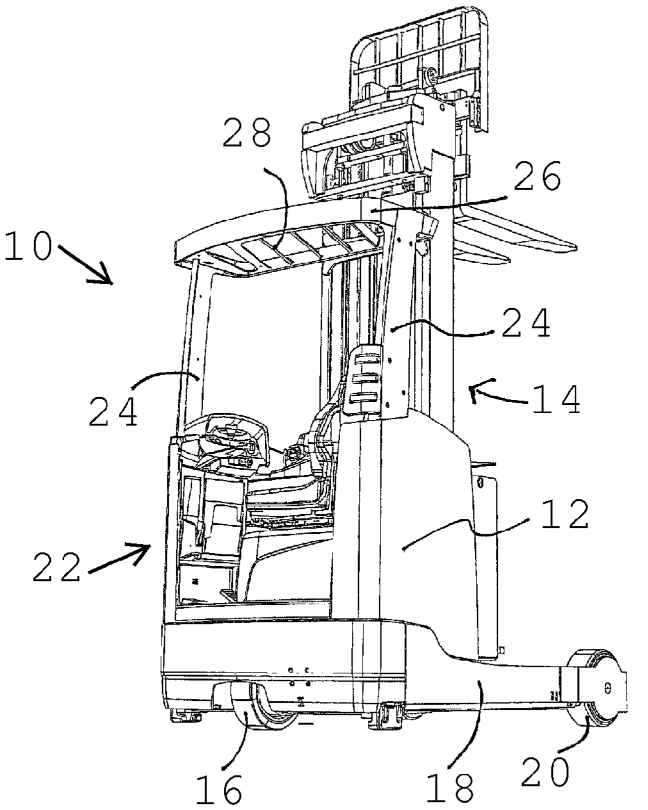
FIG. 1 PRIOR ART
FIG. 1 is a perspective view of a reach truck from the state of the art with an overhead guard, which has horizontal struts.

FIG. 1 shows a reach truck 10, which has a drive part 12 and a lift mast 14. The drive part 12 has a controlled and driven wheel 16 as well as two protruding support arms 18, each of which are provided on their ends with a wheel 20. (Only one support arm 18 and wheel 20 are shown in FIG. 1.) Between the support arms 18, a mast holder (not shown) with the lift mast 14 is moveable in the longitudinal direction.

The drive part 12 has a driver's cab 22, in which a driver can be seated transversely to the longitudinal direction of the truck or vehicle 10. The driver's cab 22 is protected via an overhead guard. The overhead guard has two columns 24 connected with the drive part 12, which carry a crown 26. In the case of the reach truck 10 from the state of the art shown in FIG. 1, the crown 26 is equipped with horizontal struts 28, which protect the driver from falling objects. Despite a tilted and spaced arrangement of the horizontal struts 28, these impair the driver's view of the lift mast 14 from his seat, in particular if it is fully extended.

Figure 2:
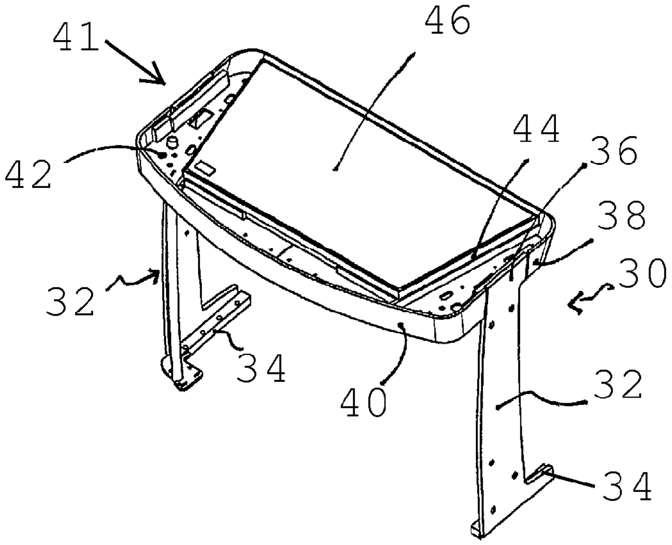
FIG. 2 is a perspective view of an overhead guard with a glass pane.

FIG. 2 shows the overhead guard 30 according to this disclosure, which comprises two columns 32. The columns 32 are respectively fastened to the drive part 12 of the reach truck via a respective flange 34. The columns 32 have a mainly flat, linear structure, which widens towards a head section or area 36. In contrast to automobile cabins, which have four columns supporting the roof, the columns 32 are designed to deform in the event of strong, abrupt loads on the overhead guard or to divert the occurring impulse into the vehicle body.

The head area 36 of the columns 32 is connected towards the back with a front belt 38 and on its rear side with a rear belt 40. The front belt 38 extends on the front side of the columns 32 respectively under two rounded 90° angles in order to delimit the front section of the crown 41. The rear belt 40 connects to the back side of the columns 32 and delimits the crown 41 towards the rear also under formation of two angle sections. As seen in FIG. 2, the front side of the front belt 38 is mainly straight while the back side of the rear belt 40 progresses in a slightly curved manner.

The belts 38, 40 are connected with the columns 32 with their vertically progressing edges. Furthermore, each of the belts 38, 40 is connected with the assembly plate 42. The assembly plate 42 serves to install additional devices, such as for example headlights, a lighting system, warning lights, DC converters, and other devices. The assembly plate 42 also carries a profile frame 44, into which a pane of glass 46 is inserted. The glass pane 46 is not covered by struts or other assemblies but rather allows full view of the lift mast.

Figure 3:
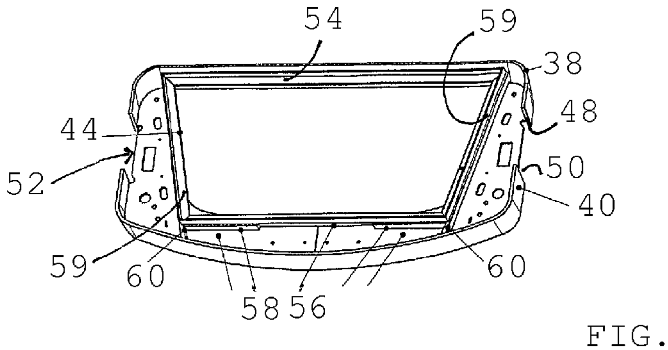
FIG. 3 is a perspective view of the crown of FIG. 2 from above with an inserted profile frame for the glass pane.

FIG. 3 shows a more detailed structure of the crown without the inserted glass pane 46. The progression of the rear belt 40 and the front belt 38 can be seen in FIG. 3. The belts 38 and 40 are welded with each column 32 in its head area 36 via their respective edges 48 and 50. It can also be clearly seen in FIG. 3 that the assembly plate 42 has a recess 52 laterally arranged, into which the respective column 32 dips in order to be welded flush with the front belt 38 and the rear belt 40.

The profile frame 44 can also be seen in FIG. 3, which consists of four profile bars arranged in a trapezoidal manner. The profile bar 54 pointing forward towards the lift frame, such as lift mast 14 in FIG. 1, is thereby connected with the front belt 38. The rear profile bar 56 is arranged parallel to the front profile bar 54 and is supported on a multi-part cross strut 58. The lateral profile bars 59 progressing diagonal to the longitudinal direction of the vehicle are connected with the front profile bar 54 and the rear profile bar 56. The lateral profile bars 59 are also arranged on a respective support profile 60 progressing in the longitudinal direction. The support profiles 60 thereby extend between the front belt 38 and the rear belt 40 and serve to fasten the lateral profiles 59 of the profile frame 44.

Figure 4:
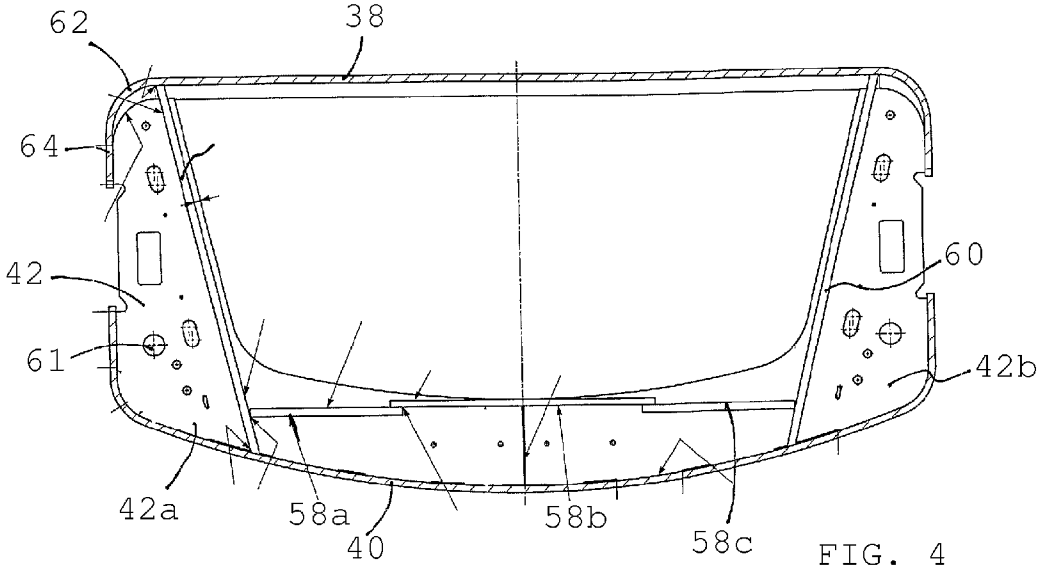
FIG. 4 is a top view of the crown of FIG. 2 with an assembly plate and support profiles.

FIG. 4 shows the structure without the inserted profile frame 44. The assembly plate 42, which consists of a first part 42*a* and an identical second part 42*b*, can be clearly seen. The assembly plate 42 is provided with a plurality of openings and bore holes 61, which allow the installation of additional devices as well as the guiding of cables through the overhead guard. The support profile 60 is connected with the front belt 38 and the rear belt 40. The connection of the support profile 60 to the front belt 38 takes place short before the bending 62 of the front belt 38, with which it passes into its side wall section 64. In this manner, the trapezoid has its maximum width on the side facing the lift frame.

It can also be seen in FIG. 4 that the cross strut 58 is arranged between the two support profiles 60 and consists of three profile sections 58*a*, 58*b*, 58*c*. The use of three profile sections has the advantage that the distance between the middle cross profile section 58*b* and the front belt 38 is less the distance between the edge profile sections 58*a*, 58*c* and the front belt 38. The profile frame 44 for receiving the glass pane 46 is welded with the front belt 38, the support profiles 60 and the profile sections 58*a*, 58*b*, 58*c* of the cross strut 58.

Figure 5:
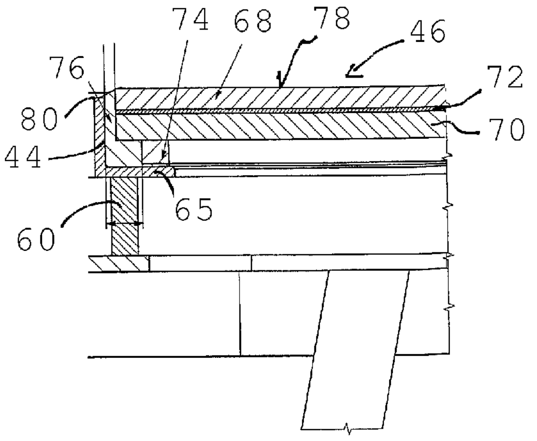
FIG. 5 is a cross-sectional view of the glass pane inserted into the profile.

FIG. 5 shows in a cross-sectional view the more detailed structure of the profile frame 44 for receiving the glass pane 46. The profile frame 44 has an angle profile, which is arranged with its horizontal side 66 on the support profiles 60. The glass pane 46 consists of two panes 68 and 70, which are interconnected via a film 72. The gluing of the glass pane 46 with the profile frame 44 takes place via a self-adhesive profile, for example an ethylene propylene diene monomer (EPDM) profile 74, which is arranged on one side on the supporting side 66 and glues the glass pane 46. For the glass pane 46 and its hold in the profile frame 44, it is also important that the joint between the glass pane 46 and the profile frame 44 as well as the connecting hollow space is jointed with joint compound 76. The edges of the glass panes 68 and 70 and in particular the edge of the film 72 are hereby sealed. This means that the EPDM profile serves to ensure an even glue thickness and a cushioned mounting of the glass pane 46. The actual fastening between the glass pane 46 and profile frame 44 takes place with an adhesive, which also simultaneously assumes the sealing of the edges.

As shown in FIG. 5, the top edge 78 of the glass plane 42 can protrude over the top edge 80 of the profile frame 44 without safety being impaired by the glass roof.

In contrast to the use of supporting glass panes in cabin constructions, such as for example in counterbalance trucks, attention is paid in the case of the arrangement of the glass pane in the profile frame and its fastening in the crown that the overhead guard has a considerably lower torsional stiffness than a cabin with its columns. All safety requirements specified by standards can be met when using a laminated safety glass.

The invention claimed is:

1. An industrial truck with a canopy, comprising:

at least two columns arranged laterally on the truck:

a crown equipped with one or more belts, the crown supported by the at least two columns;

an assembly plate having an opening connected with the one or more belts;

a roof supported within the opening of the assembly plate, the roof providing a surface through which a user can see;

a circumferential profile frame connected elastically with the roof using at least one of a belt of the one or more belts or at least one support profile extending between adjacent belts of the one or more belts.

2. The industrial truck according to claim 1, wherein the at least one support profile comprises a pair of support profiles extending in a longitudinal direction of the truck between the adjacent belts.

3. The industrial truck according to claim 2, further comprising:

at least one cross profile is arranged between the pair of support profiles transversal to the longitudinal direction.

4. The industrial truck according to claim 3, wherein the profile frame is connected with the belt of the one or more belts, the pair of support profiles, and the at least one cross profile.

5. The industrial truck according to claim 1, wherein the at least one support profile comprises a plurality of support profiles connected elastically with the roof.

6. The industrial truck according claim 1, wherein the one or more belts of the crown include a front belt and a rear belt, each of which is connected with the assembly plate and on their ends respectively with one of the two columns.

7. The industrial truck according to claim 1, wherein the assembly plate has an opening for installation of an additional device at least one of at or on the overhead guard.

8. The industrial truck according claim 1, wherein the roof is a glass roof having a trapezoidal shape.

9. The industrial truck according to claim 1, wherein the roof is a glass roof is made of a laminated safety glass.

10. The industrial truck according to claim 1, wherein the profile frame has an L-shaped profile, and wherein the roof is glued in the profile frame.

11. The industrial truck according to claim 1, wherein the profile frame has at least one recess arranged below the roof, through which a cutting wire can be guided through a gap between the roof and a side of the profile frame including the at least one support profile.

12. The industrial truck according to claim 1, wherein the at least one support profile and the one or more belts each have a rectangular cross-section.

* * * * *